3,042,722
OXIDATION OF CYCLIC OLEFINS
Emil F. Jason and Ellis K. Fields, Chicago, Ill., assignors to Standard Oil Company, Chicago, Ill., a corporation of Indiana
No Drawing. Filed Aug. 31, 1959, Ser. No. 836,890
6 Claims. (Cl. 260—586)

This invention relates to the oxidation of cyclo-olefins and more specifically pertains to the catalytic liquid phase oxidation of cyclic mono-olefins to ketones.

It is known that cyclohexane can be oxidized in the liquid phase with molecular oxygen-containing gas to produce mixtures containing mainly cyclohexanol and cyclohexanone in relatively low conversions on a single pass basis; however, after separation of the mixture of cyclohexanol and cyclohexanone from the reaction product, the remainder thereof is recycled to the oxidation step.

We have discovered that cyclic mono-olefins can be oxidized in a liquid phase system to cyclic olefinic ketones with molecular oxygen-containing gas in the presence of a catalyst system comprising a source of bromine and a heavy metal oxidation catalyst when the liquid phase is only mildly acidic, above a pH of about 5 and preferably from about 6 to 7. When the reaction medium is strongly acidic, the cyclic mono-olefins are converted to substantial amounts of $CO_2$ and water and small amounts of lower aliphatic acids such as acetic and formic acids. By this process cyclohexene can be successfully oxidized to cyclohexenone, and cyclopentene can be oxidized to cyclopentenone. Also, the 1-methyl derivatives of cyclohexene and cyclopentene can be oxidized to the corresponding methyl cyclohexenone and methyl cyclopentenone. Ethyl derivatives of these two cyclic olefins, when oxidized according to the process of this invention, result in the formation of diketones, such as acetyl cyclohexenone and acetyl cyclopentenone, as well as acetyl cyclohexene and acetyl cyclopentene. Cyclohexene and cyclopentene, when substituted with alkyl groups containing more than 2 carbon atoms, may also yield the ketones analogous to those obtained from the ethyl substituted starting materials.

The process may be carried out at temperatures of from 150 to 350° F. and at a pressure sufficient to maintain a liquid phase. Pressures of from 100 to 1000 pounds per square inch gauge may be employed. It is also desirable to employ a liquid reaction medium or solvent to provide an intimate admixture of the hydrocarbon to be oxidized in the catalyst system. Any inert non-polar solvent or combination of solvents may be employed which will provide a mildly acidic reaction medium. Benzene is the preferred reaction medium or solvent. Mixtures of benzene and a lower aliphatic monocarboxylic acid containing 5 to 50% of the lower aliphatic monocarboxylic acid, preferably acetic acid, can be employed. The lower aliphatic monocarboxylic acid is employed to provide a solvent for the metal oxidation catalyst. The preferred mixture of benzene and acetic acid is one containing 10% glacial acetic acid. The amount of solvent to be employed can be varied widely to provide from 5 to 75% by weight of the cyclic mono-olefin in the solvent. The preferred concentration of cyclic olefins in the solvent is 20 to 35% by weight. A buffering material may also be employed to aid in maintaining a substantially constant, mildly acidic reaction medium.

The process of this invention is conveniently conducted in a suitable pressure apparatus containing corrosion-resistant inner surfaces, such as those provided by glass or ceramic-lined apparatus and apparatus constructed of titanium or corrosion-resistant alloys, such as Hastelloy C and certain stainless steels such as a 316 stainless steel.

The following specific examples will illustrate the process of our invention.

*Example I*

A mixture containing 82.1 grams of cyclohexene, 200 milliliters of benzene, 10 grams of glacial acetic acid, 5 milliliters of standard aqueous buffer solution (Fisher chemical standard buffer solution, pH 6.00 in water) and 5 milliliters of an aqueous solution containing .3 gram of manganese acetate and .5 gram ammonium bromide, is heated to 260° F. in a corrosion-resistant oxidation reactor wherein the pressure is maintained at 400 p.s.i.g. to provide a liquid phase. Air at slightly above 400 p.s.i.g. is passed into the liquid phase. Heat of reaction is removed by condensing benzene and acetic acid from the vapors and returning the condensate to the reaction zone. Air is fed into the reaction zone until the oxygen in the exit gases is substantially the same as in air. Thereafter the reaction mixture is cooled. The organic layer is separated from the aqueous layer and is distilled to recover cyclohexenone.

By this process cyclohexenone is recovered in a 30% yield, having a boiling point of 165–169° C. at atmospheric pressure, a refractive index $n_D^{20}$ of 1.4850 which is in close agreement with the comparable literature values: boiling point 169–171° C. and a refractive index $n_D^{18}$ of 1.4842. Of the original cyclohexene, 58% was recovered, and 12% remained as non-distillable residue.

Cyclopentenone can be prepared by substitution of cyclopentene for cyclohexene in the process of the foregoing reaction.

*Example II*

The process of Example I is repeated except that the buffer is omitted. The conversion of cyclohexene is 50% and the yield of cyclohexenone is 10% based on the cyclohexene charged.

The process of Example I can be carried out substituting manganese bromide for the manganese acetate and ammonium bromide employed therein with substantially equivalent results. Also, cobalt acetate can be employed with ammonium bromide in place of the manganese acetate and ammonium bromide employed in Example I to provide the catalyst system for the production of cyclohexenone with substantially equivalent results. Also, combinations of heavy metal salts and/or heavy metal bromides such as, for example, a combination of manganese acetate and cobalt acetate with ammonium bromide, hydrogen bromide, bromine, tetrabromoethane, or a mixture of manganese bromide and cobalt bromide are employed to provide the catalyst system for the process as described in Example I.

As hereinbefore indicated, the catalyst system for the process of this invention comprises a source of bromine and a heavy-metal oxidation catalyst. Metals of the group of heavy metals shown in the "Periodic Chart of Elements," appearing on pages 56 and 57 of the "Handbook of Chemistry," 8th Edition, published by Handbook Publishers, Inc., Sandusky, Ohio (1952), have been found desirably applicable to this invention for furnishing the metal or metal ion portion of the metal-bromine catalyst. Of the heavy metal group, those metals having an atomic number not greater than 84 have been found most useful. Excellent results are obtained by the utilization of a metal having an atomic number of from 23 to 28 inclusive. Particularly excellent results are obtained with a metal of the group consisting of manganese, cobalt, nickel, iron, chromium, vanadium, molybdenum, tungsten, tin and cerium. It has also been found that the catalytic amount of the metal may be provided either by a single metal or a combination of such metals. The metal may be added in elemental form, as the oxide or hydroxide, or in the form of a metal salt. For example, the metal manganese may be employed as the manganese salt of an organic carboxylic acid, such as manganese naphthenate, manganese toluate, manganese acetate, etc., in the form of an organic complex, such as the acetylacetonate, the 8-hydroxyquinolate and the ethylene diamine tetra-acetate, as well as inorganic manganese salts such as the borates, halides and nitrates.

The bromine may be added in elemental, combined or ionic form. As a source of available bromine, ammonium bromide or other compounds soluble in the reaction medium may be employed. Satisfactory results can be obtained, for example, with potassium bromate, tetrabromoethane, benzyl bromide and the like.

The amount of metal catalyst employed is not critical and may be in the range of about 0.01 to about 10% by weight or more based on the feed stock reactant. Where the heavy metal is introduced as a bromide salt, for example as manganese bromide, the proportions of manganese and bromine will be in their stoichiometric proportions. The ratio of metal to bromine may be varied from such proportions within the range of about 1 to 10 atoms of heavy metal oxidation catalyst per atom of bromine to about 1 to 10 atoms of bromine per atom of heavy metal.

What is claimed is:

1. The preparation of a ketone of a cyclic mono-olefin which comprises: oxidizing in the liquid phase a cyclic olefin hydrocarbon selected from the group consisting of cyclic mono-olefin hydrocarbon and 1-alkyl hydrocarbon derivatives thereof with a molecular oxygen-containing gas in the presence of an inert, mildly acidic reaction medium buffered to a pH above 5 and up to 7 and a catalyst system consisting essentially of bromine and a heavy metal oxidation catalyst, and recovering from the resulting reaction mixture a ketone of a cyclic mono-olefin.

2. The process of claim 1 wherein the molecular oxygen containing gas is air.

3. The process of claim 1 wherein the inert reaction medium comprises benzene and a minor amount of a lower aliphatic monocarboxylic acid.

4. The process of claim 1 wherein the inert reaction medium comprises benzene and a minor amount of acetic acid.

5. The process of claim 1 wherein the heavy metal oxidation catalyst is a manganese oxidation catalyst.

6. The process for the preparation of cyclohexenone which comprises: oxidizing cyclohexene in the liquid phase with air in the presence of an inert reaction medium comprising benzene and from 5 to 50% by weight acetic acid buffered to a pH of above 5 and up to 7, and a catalyst system consisting essentially of bromine and manganese oxidation catalyst, and recovering from the resulting reaction mixture cyclohexenone.

References Cited in the file of this patent

UNITED STATES PATENTS

| | | |
|---|---|---|
| 2,223,500 | Scott et al. | Dec. 3, 1940 |
| 2,833,816 | Saffer et al. | May 6, 1958 |
| 2,920,087 | Hay | Jan. 5, 1960 |
| 2,992,272 | Hay | July 11, 1961 |